US012570871B2

(12) United States Patent
Lim et al.

(10) Patent No.: US 12,570,871 B2
(45) Date of Patent: Mar. 10, 2026

(54) METHOD FOR SOLUTION COATING OF INORGANIC SUPERHYDROPHILIC THIN FILM

(71) Applicants: Agency for Science, Technology and Research, Singapore (SG); University College London, London (GB)

(72) Inventors: Yee Fun Lim, Singapore (SG); Gregory Kia Liang Goh, Singapore (SG); John Chapman-Fortune, Singapore (SG)

(73) Assignees: Agency for Science, Technology and Research, Singapore (SG); University College London (GB)

( * ) Notice: Subject to any disclaimer, the term of this patent is extended or adjusted under 35 U.S.C. 154(b) by 507 days.

(21) Appl. No.: 18/019,003

(22) PCT Filed: Aug. 3, 2021

(86) PCT No.: PCT/SG2021/050450
§ 371 (c)(1),
(2) Date: Jan. 31, 2023

(87) PCT Pub. No.: WO2022/031229
PCT Pub. Date: Feb. 10, 2022

(65) Prior Publication Data
US 2023/0295461 A1 Sep. 21, 2023

(30) Foreign Application Priority Data
Aug. 5, 2020 (SG) ........................... 10202007507V

(51) Int. Cl.
*C09D 183/02* (2006.01)
*C08G 77/02* (2006.01)
(Continued)

(52) U.S. Cl.
CPC ........... *C09D 183/02* (2013.01); *C08G 77/02* (2013.01); *C09D 1/04* (2013.01); *B05D 1/36* (2013.01)

(58) Field of Classification Search
CPC .......... B05D 1/36; C09D 183/02; C09D 5/50; C09D 1/02; C09D 1/04
See application file for complete search history.

(56) References Cited

U.S. PATENT DOCUMENTS 4,226,277 A * 10/1980 Matalon .................. B22C 1/186
164/7.1
4,396,430 A * 8/1983 Matalon .................... B22C 1/02
106/217.7
(Continued)

FOREIGN PATENT DOCUMENTS

CN 109401367 A 3/2019
EP 1048696 B1 12/2004
(Continued)

OTHER PUBLICATIONS

International Search Report for International Application No. PCT/SG2021/050450 dated Nov. 1, 2021, pp. 1-3.
(Continued)

*Primary Examiner* — Margaret G Moore
(74) *Attorney, Agent, or Firm* — Shackelford, McKinley & Norton, LLP

(57) ABSTRACT

A method of producing a silica-based superhydrophilic film. A coating formulation is provided, where the coating formulation includes an alkali metal silicate having a substantial portion of water removed therefrom, where the alkali metal silicate has a formula of $M_2O \cdot nSiO_2$, and where M represents an alkali metal and n is a positive real number greater than zero. Furthermore, the coating formulation and an alcohol including a curing agent are mixed, where the curing agent includes an acid or an alkaline earth metal
(Continued)

Potassium metasilicate pentahydrate

HCl
Alcohol medium

Drying

Potassium metasilicate

+ KCl + H₂O

Silica halide. Additionally, the coating formulation is dried to form the silica-based superhydrophilic film. Furthermore, a silica-based superhydrophilic film is produced according to such a method, where the silica-based superhydrophilic film includes an amine stabilizer.

14 Claims, 6 Drawing Sheets

(51) Int. Cl.
_C09D 1/04_            (2006.01)
_B05D 1/36_            (2006.01)

(56)                References Cited

U.S. PATENT DOCUMENTS

| | | | |
|---|---|---|---|
| 9,206,335 B2 | 12/2015 | Hager et al. | |
| 2016/0168021 A1 | 6/2016 | Goh et al. | |
| 2017/0121532 A1 * | 5/2017 | Lee ........................ | C23C 18/122 |

FOREIGN PATENT DOCUMENTS

| | | |
|---|---|---|
| JP | H09278431 A | 10/1997 |
| KR | 100501797 B1 | 7/2005 |

OTHER PUBLICATIONS

Written Opinion of the International Searching Authority for International Application No. PCT/SG2021/050450 dated Nov. 1, 2021, pp. 1-5.

* cited by examiner

METHOD FOR SOLUTION COATING OF INORGANIC SUPERHYDROPHILIC THIN FILM

CROSS-REFERENCE TO RELATED APPLICATION

This application claims the benefit of priority of Singapore Patent Application No. 10202007507V, filed 5 Aug. 2020, the content of it being hereby incorporated by reference in its entirety for all purposes.

TECHNICAL FIELD

The present disclosure relates to a method of producing a silica-based superhydrophilic film. The present disclosure also relates to a silica-based superhydrophilic film.

BACKGROUND

Superhydrophilic coatings may have attracted attention for use in anti-fog and self-cleaning applications. Traditionally, superhydrophilic coatings may be classified under one of the categories: (i) polymer solutions that may be spray-coated onto a surface, (ii) single-layer or multi-layer polymer coatings on plastic or glass, (iii) $TiO_2$ and other metal oxide photocatalyst based coatings. While each of these products may be commercially available, such products may have its own disadvantage. For example, polymer coatings tend to have low scratch resistance and durability, and may be susceptible to degrading under ambient conditions over time. As for $TiO_2$ based coatings, ultraviolet light tends to be required for activation, which may be unlikely to work under low-light or night time conditions.

There is thus a need to provide for a solution that addresses one or more of the limitations mentioned above.

SUMMARY

In a first aspect, there is provided for a method of producing a silica-based superhydrophilic film, the method includes:

providing a coating formulation including an alkali metal silicate having a substantial portion of water removed therefrom, wherein the alkali metal silicate has a formula of $M_2O \cdot nSiO_2$, wherein M represents an alkali metal and n is a positive real number greater than zero;

mixing the coating formulation and an alcohol that includes a curing agent, wherein the curing agent includes an acid or an alkaline earth metal halide; and drying the coating formulation to form the silica-based superhydrophilic film.

In another aspect, there is provided for a silica-based superhydrophilic film produced according to a method described in various embodiments of the first aspect, wherein the silica-based superhydrophilic film includes an amine stabilizer.

BRIEF DESCRIPTION OF THE DRAWINGS

The drawings are not necessarily to scale, emphasis instead generally being placed upon illustrating the principles of the present disclosure. In the following description, various embodiments of the present disclosure are described with reference to the following drawings, in which.

DETAILED DESCRIPTION

Figure 1:
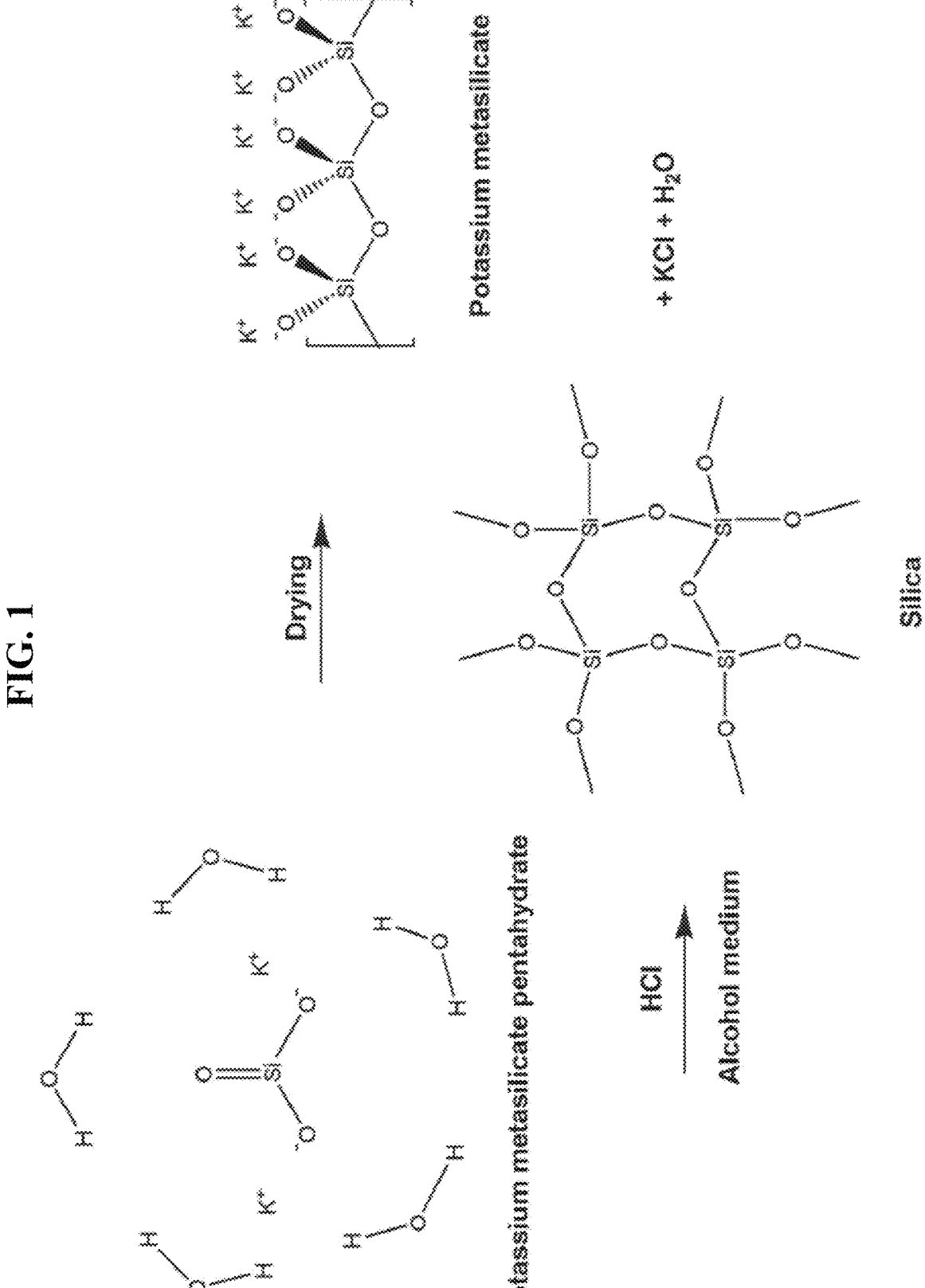
FIG. 1 depicts a reaction scheme for drying and acid curing of a potassium silicate film.
Figure 2:
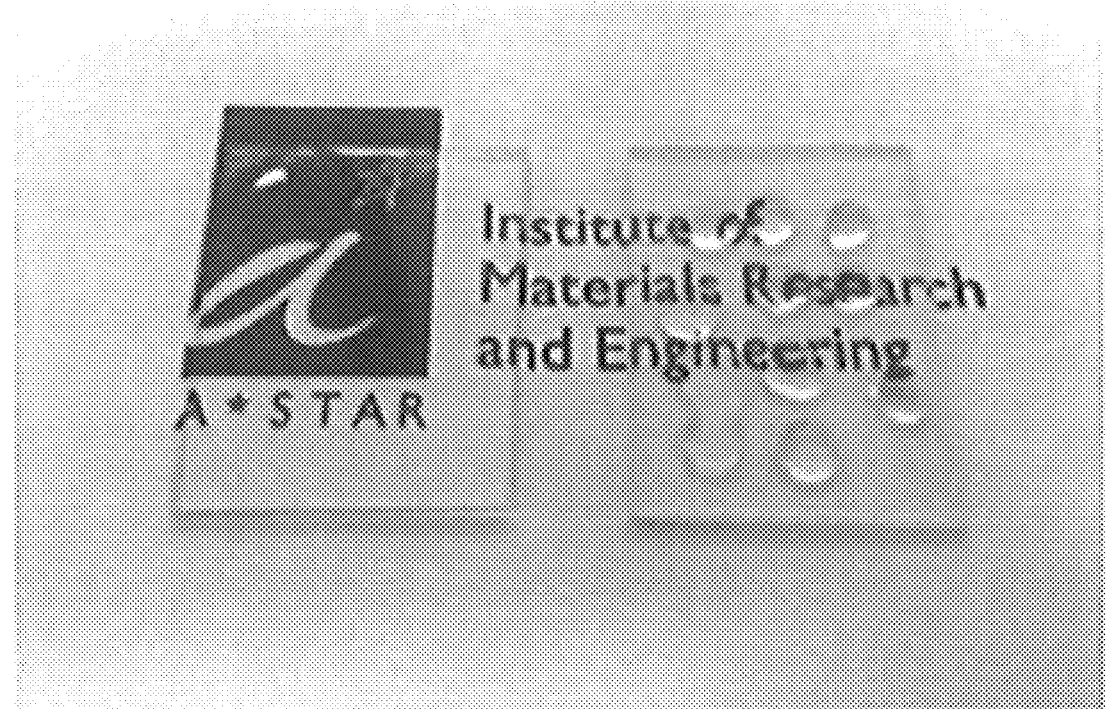
FIG. 2 is an optical image demonstrating water spreading out on a surface coated with the coating of the present disclosure (left) compared to water beads forming on a surface not coated with the coating of the present disclosure.

The following detailed description refers to the accompanying drawings that show, by way of illustration, specific details and embodiments in which the present disclosure may be practiced.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

Details of various embodiments of the method of the first aspect and the superhydrophilic film produced by the method described in various embodiments of the first aspect, are now described below. Advantages associated with the various embodiments are described and demonstrated further below in the examples.

The present disclosure relates to a method of producing a silica-based superhydrophilic film. For brevity, the silica-based superhydrophilic film may be referred herein to as a coating. The term "superhydrophilic", and grammatical variants thereof, herein may refer to a material or surface having a water contact angle of 10° or less, 5° or less, or 1° or less.

The method includes providing a coating formulation comprising an alkali metal silicate having a substantial portion of water removed therefrom, wherein the alkali metal silicate has a formula of $M_2O \cdot nSiO_2$, wherein M represents an alkali metal and n is a positive real number greater than zero. The present method includes mixing the coating formulation and an alcohol that includes a curing agent, wherein the curing agent includes an acid or an alkaline earth metal halide. The present method includes drying the coating formulation to form the silica-based superhydrophilic film.

In the context of the present disclosure, the expression "substantial portion of water removed" may mean about 90%, 95%, 98%, 99%, but not 100% of water removed.

Nevertheless, where necessary, the word "substantial" may be omitted from the definition of the present disclosure. The term "alkali metal" refers to an element from group one of the chemical periodic table, which may include lithium, sodium, potassium, etc.

In various embodiments, there may be no upper limit on n, i.e. n may be 100, 1000, or even 10,000. As a non-limiting example, n may range from 0.4 to 4.0.

In various embodiments, providing the coating formulation may include dissolving the alkali metal silicate in an aqueous solvent. The aqueous solvent may include or may be water. The alkali metal may include or may be potassium, sodium, or lithium.

In various embodiments, providing the coating formulation may include depositing the coating formulation on a substrate prior to mixing the coating formulation and the alcohol. Suitable deposition of the coating formulation may be carried out by, for example, spin-coating, spraycoating, blade-coating, brush-coating, dip-coating, etc.

The present method may further include adding an aqueous amine stabilizer to the coating formulation and/or to the alcohol prior to mixing the coating formulation and the alcohol. Advantages of the amine stabilizer are described in the examples further hereinbelow and are not reiterated for brevity. The term "stabilizer" may be used herein exchangeably with "stabilizing agent".

In various embodiments, the aqueous amine stabilizer may include or may be methenamine in water, formamide in water, acetamide in water, or ethanolamine in water.

The present method may further include adding silica particles to the coating formulation prior to mixing the coating formulation and the alcohol. Advantages of adding silica particles are described in the examples further hereinbelow and are not reiterated for brevity. In various embodiments, the silica particles can be fumed silica particles. In certain embodiments, the silica particles need not be fumed silica particles. In other words, in various embodiments, any suitable silica particles may be used, wherein the consideration may include particles that may be easily dispersed in the coating formulation. For particles that may be easily dispersed in the coating formulation, such particles may have a size of 1 µm or less.

In various embodiments, mixing the coating formulation and the alcohol may include (i) applying the alcohol to the coating formulation or (ii) contacting the coating formulation with the alcohol. In various embodiments, the alcohol may include or may be methanol, ethanol, isopropanol, 1-propanol, butanol, or 2-methoxyethanol. In various embodiments, the alcohol may be miscible with water. Such alcohols may be short carbon chain alcohols having less than 5 carbon atoms, which may include, but not limited to, 1-propanol, butanol, and 2-methoxyethanol. Long chain alcohols having more carbon atoms may be avoided. Advantages of the alcohol that includes the curing agent are described further hereinbelow in the examples and shall not be reiterated for brevity.

In various embodiments, the acid may include or may be hydrochloric acid, sulfuric acid, phosphoric acid, nitric acid, or acetic acid. In various embodiments, other acids, including inorganic acids like phosphoric acid and nitric acid, and organic acids like as acetic acid, may be used. Advantages of the acid are described further hereinbelow in the examples and shall not be reiterated for brevity.

In various embodiments, the alkaline earth metal halide is soluble in the alcohol (e.g. isopropanol). Non-limiting examples of such alkaline earth metal halide include but are not limited to calcium chloride and magnesium chloride. In various instances, the alkaline earth metal halide may include or may be calcium chloride or magnesium chloride. Advantageously, the alkaline earth metal halide may impart the same advantages as the acid, e.g. permanent water resistance to the resultant coating. Like the acid, the alkaline earth metal halide may aid in cross-linking of the silicate network. Other advantages of the alkaline earth metal halide are described further hereinbelow in the examples and shall not be reiterated for brevity. The term "alkaline earth metal" herein refers to an element from group two of the chemical periodic table, which may include magnesium, calcium, etc. The term "halide" refers to an anion of an element from group 17 of the chemical periodic table, which may include chloride, bromide, etc.

In various embodiments, the mixing of the coating formulation and the alcohol that includes the curing agent may be for a brief duration. For example, the duration may be 1 minute or less, or even 10 seconds or less. In various embodiments, mixing the coating formulation and the alcohol may be carried out in a duration of 10 seconds or less, 10 seconds or less. Subsequently, the coating formulation that has been mixed with the alcohol that includes the curing agent may be allowed to dry for at least 5 minutes before rinsing with water.

The present method may further include rinsing the silica-based superhydrophilic film with water before drying the coating formulation to form the silica-based superhydrophilic film. In various embodiments, drying the coating formulation to form the silica-based superhydrophilic film may be carried out at a temperature ranging from 20° C. to 150° C. In various embodiments, the temperature range for drying may be selected based on considerations such as coating thickness, silica particle content, and/or viscosity of coating formulation. For example, if the coating formulation happens to be very viscous, e.g. due to high silica particles content, a thick film may be produced at a lower temperature of the range specified above instead of at 150° C. to avoid cracking of the resultant film. Nevertheless, the temperature range specified above is suitable and broadly usable for various formulation recipes.

The present method may further include annealing of the silica-based superhydrophilic film. Advantages of the annealing are described further hereinbelow in the examples and shall not be reiterated for brevity.

The present disclosure also relates to a silica-based superhydrophilic film produced according to a method described in various embodiments of the first aspect. Embodiments and advantages described for the method of the first aspect can be analogously valid for the silica-based superhydrophilic film subsequently described herein, and vice versa. As the various embodiments and advantages have already been described above and in the examples demonstrated further hereinbelow, they shall not be iterated for brevity.

The silica-based superhydrophilic film may include an amine stabilizer. In various embodiments, the amine stabilizer may include or may be methenamine, formamide, acetamide, or ethanolamine.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure relates to a method of forming an inorganic superhydrophilic coating. The superhydrophilic coating may be based on an alkali metal silicate, for example, potassium silicate or waterglass (e.g. sodium silicate). Generally, using potassium silicate as a non-limiting example, the potassium silicate can be deployed from an aqueous solution at a concentration of, e.g. 28 to 30 wt %.

Pure potassium silicate coating may be deliquescent (i.e. tendency to become a liquid) and may be unstable under humid conditions. However, the present method may involve a small amount of amine stabilizer, e.g. methenamine, to stabilize the coating. Fumed silica can be added to increase the coating's robustness against thermal stress, and to control the coating's viscosity during its formulation.

An acidic curing solution (or an alkaline earth metal halide curing solution) can then be applied onto the coating to convert most of the alkali metal silicate into silica, imparting permanent water resistance to the coating and at the same time retaining the superhydrophilic properties. The acidic curing solution and the alkaline earth metal halide curing solution, which are alcohol-based solutions (i.e. an alcohol-based acid curing solution or alcohol-based alkaline earth metal halide curing solution, respectively), advantageously do not dissolve the potassium silicate coating, thereby preserving the coating's integrity, and at the same time the alcohol-based curing solutions continue to possess properties that enable the coating curing process to take place. For example, using alcohol as a solvent, the acid does not lose its acidity in alcohol for the curing to take place. The stabilization effect of the amine stabilizer (e.g. methenamine) also imparts long-term superhydrophilicity to the resultant coating.

The present method and the resultant inorganic superhydrophilic coating are described in further details, by way of non-limiting examples, as set forth below.

Example 1: General Discussion and Considerations

Waterglass coatings of the present disclosure include an alkali metal silicate with the general chemical formula $M_2O \cdot nSiO_2$, wherein M can be Li, Na, or K. In the discussions that follow, potassium silicate (M=K) is used as a non-limiting example for describing the present disclosure. That is to say, other alkali metals such as lithium and sodium can be used accordingly in the present method, and hence the discussion of chemistries applies to lithium and sodium silicates as well.

With reference to FIG. 1, potassium silicate coatings of the present disclosure can be deposited from a form of aqueous solution. Upon drying, it can be possible to remove most of the water of hydration that is present in the silicate structure, but the coating remains water soluble and may be easily damaged by water. An acid treatment step is necessary to remove the potassium $K^+$ ions, allowing the cross-linking of the silicate network (see FIG. 1). This imparts the desired water resistance to the coating. Traditionally, an aqueous acid solution is used. However, such aqueous acid solution may undesirably dissolve the coating partially before the cross-linking step completes, and the resultant coating may then lose mechanical integrity.

In the present method, an alcohol-based acidic medium for the above-mentioned curing (i.e. cross-linking) step, which include a dilute acid dissolved in an alcohol solvent at a concentration, e.g. up to 20% by volume, is utilized. The alcohol in the alcohol-based acidic medium serves as a non-solvent for the potassium silicate, and the low water content of this curing solution ensures that the coating integrity is not affected. As for the acid in the alcohol-based medium, the acid retains its ability to cross-link the silicate network even when dissolved in the alcohol medium. Advantageously, the alcohol-based medium of the present disclosure renders formation of robust water resistant silicate films with good mechanical properties. It may be noted that some $K^+$ ions remain within the film, which can impart the superhydrophilicity.

Another consideration is the long-term stability of the coating. First of all, the resultant coating is robust against thermal stress or cycling, this property can be enabled or enhanced via the incorporation of silica particles to impart mechanical support, or by annealing the coating at higher temperatures. Secondly, the resultant coating does not suffer from efflorescence, which is a process whereby the silicate coating reacts with carbon dioxide in the air to form unsightly white carbonates on the surface. Efflorescence can be prevented or reduced by amine additives in the coating formulation of the present disclosure, and/or additional drying and curing cycles incorporated in the coating post-deposition treatment process. The amine stabilization confers the additional advantage of durable superhydrophilicity, which persists for a long time (over 3 months).

Example 2: Present Method Formulation Parameters

As described above, the coating process involves two components, i.e. the coating formulation based on an aqueous silicate, and the curing formulation that is alcohol-based. The compositions of the two components (i.e. coating formulation and curing formulation) can be described as follows:

The coating formulation may include:

1. An aqueous solution of alkali metal silicate, which can be potassium silicate, sodium silicate, or lithium silicate. The silicate concentration can be in the range of 10 to 40% by weight, in water.

2. Fumed silica particles (e.g. 10 nm to 300 nm in diameter), added at a weight concentration of 0 to 10% of the aqueous solution of alkali metal silicate in (1).

3. An amine stabilizer, such as but not limited methenamine, in an aqueous solution (e.g. concentration 0.1 to 1.0 M), added at a weight concentration of 0 to 10% of the aqueous solution of alkali metal silicate in (1).

In the coating formulation, it can be seen that the alkali metal silicate is needed. The silica particles and the amine stabilizer may be optional, which explains the concentration range starting from 0%.

The curing formulation may include:

1. An aqueous acid (e.g. hydrochloric or sulfuric acid, concentration 0.1 to 2.0 M), dissolved in an alcohol solvent (e.g. ethanol or isopropanol) at a volume concentration of 5 to 20%.

2. Alternatively, instead of an aqueous acid, an alkaline earth metal halide salt (e.g. calcium chloride) can be used and dissolved in an alcohol solvent at a weight concentration of 5 to 10%.

3. The amine stabilizer as described above (e.g. 0.1 to 1.0 M aqueous solution) can be added to the curing formulation above instead of the coating formulation, at a volume concentration of 0 to 10%. In other words, the amine stabilizer may be present in the coating formulation and/or in the curing formulation.

The amine stabilizer can also be used as a standalone curing formulation, wherein the amine stabilizer is dissolved in an alcohol solvent at a weight concentration of 1 to 10%.

Typically, in the curing step, either the dissolved acid or dissolved calcium chloride in alcohol can be used, although they can also be used one after the other. Both impart the same advantages, e.g. permanent water resistance to the resultant coating. The resultant coating film derived using acid can have superior mechanical properties.

The amine stabilizer is optional, for example, if it has been omitted in the coating formulation then it can be added in the curing formulation. As mentioned above, the amine stabilizer can be added into a curing formulation derived from either the aqueous acid or aqueous alkaline earth metal halide, but if used as a standalone it may be preferably deployed first and then followed with the acid or calcium chloride solution. This is because upon acid or the alkaline earth metal halide treatment, the film may become inert and no longer react with the amine solution.

The formulation can be formed into a coating (e.g. a film) by various solution coating methods, including but not limited to, spin-coating, spraycoating, blade-coating, brush-coating, dip-coating, etc.

Drying and annealing temperatures can range from ambient room temperature (e.g. about 25° C.) to 150° C. The resultant coating can be formed on substrates, such as ceramic, glass, metal, etc.

Example 3A: A Non-Limiting Example of the Present Method

30% Potassium silicate aqueous solution (Potassium Silicate 28/30° from Kramer Pigments) was diluted with deionized (DI) water (added at 50% by volume of the potassium silicate solution). Fumed silica (200 nm to 300 nm diameter) was then added at a concentration of 3.3% by weight of the total solution, which was followed by addition of 0.7 M methenamine solution in water at a concentration of 16.7% by volume of the total solution. The formulation was blade-coated at approximately 2 mm/s onto glass, and then dried in an oven at 105° C. for 5 minutes. Subsequently, the coating was treated with a curing solution comprising 0.5 M $H_2SO_4$ mixed in isopropanol at a volume concentration of 5%, before rinsing in DI water and then drying in a compressed air stream.

Example 3B: A Non-Limiting Example of the Present Method

30% potassium silicate aqueous solution (Potassium Silicate 28/30° from Kramer Pigments) was blade-coated at approximately 2 mm/s onto stainless steel foil, and then dried in an oven at 60° C. for 5 minutes. Subsequently, the coating was treated with a curing solution comprising 0.5 M $H_2SO_4$ mixed in isopropanol at a volume concentration of 5%, before rinsing in DI water and then drying in a compressed air stream. The oven drying and treatment by curing solution was repeated one more time, before a final thermal annealing step at 150° C. for 60 minutes.

Example 3C: A Non-Limiting Example of the Present Method

30% potassium silicate aqueous solution (Potassium Silicate 28/30° from Kramer Pigments) was blade-coated at approximately 2 mm/s onto glass, and then dried in an oven at 60° C. for 5 minutes. Subsequently, the coating was treated with a 7% by weight calcium chloride solution in isopropanol, followed by a solution comprising 0.5 M $H_2SO_4$ mixed in isopropanol at a volume concentration of 5%. It was then rinsed in DI water and then dried in a compressed air stream.

Example 3D: A Non-Limiting Example of the Present Method

30% potassium silicate aqueous solution (Potassium Silicate 28/30° from Kramer Pigments) was blade-coated at approximately 2 mm/s onto glass, and then dried in an oven at 60° C. for 5 minutes. Subsequently, the coating was treated with a curing solution based on isopropanol solvent with the following components: (i) 5% (by volume) of aqueous 0.5 M $H_2SO_4$ and (ii) 10% (by volume) of aqueous 0.7 M methenamine solution. It was then rinsed in DI water and then dried in a nitrogen stream.

Example 3E: A Non-Limiting Example of the Present Method

30% potassium silicate aqueous solution (Potassium Silicate 28/30° from Kramer Pigments) was diluted with DI water (added at 50% by volume of the potassium silicate solution). Nano-silica (10 to 20 nm diameter) was then added at a concentration of 3.3% by weight of the total solution. The formulation was blade-coated at approximately 2 mm/s onto glass, and then dried in an oven at 60° C. for 5 minutes. Subsequently, the coating was treated with a curing solution comprising of 5% (by weight) methanamine solution in isopropanol, followed by another curing solution comprising of 0.5 M $H_2SO_4$ mixed into isopropanol at a volume concentration of 5%. Finally, the coating was rinsed in DI water and then dried in a compressed air stream.

Example 3F: A Non-Limiting Example of the Present Method

30% potassium silicate aqueous solution (Potassium Silicate 28/30° from Kramer Pigments) was diluted with DI water (added at 50% by volume of the potassium silicate solution). Nano-silica (10 to 20 nm diameter) was then added at a concentration of 8% by weight of the total solution. The formulation was dip-coated onto aluminum substrate, and the substrate was withdrawn from the solution at a rate of 1 mm/s. A higher concentration of silica was added to produce a more viscous solution for dip-coating, which produces thinner films than blade-coating with the same coating formulation. The coating was dried in an oven at 60° C. for 5 minutes, and then dip-coated into a curing solution comprising of 0.5 M $H_2SO_4$ mixed into isopropanol at a volume concentration of 5%. The coating was allowed to immerse in the curing solution for 1 minute before withdrawal, at a speed of 1 mm/s. Finally, the coating was rinsed in DI water and then dried in a compressed air stream.

Figure 3:
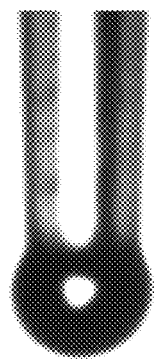
FIG. 3 demonstrates the near zero water contact angle on a surface coated with a superhydrophilic coating of the present disclosure.
Figure 3:
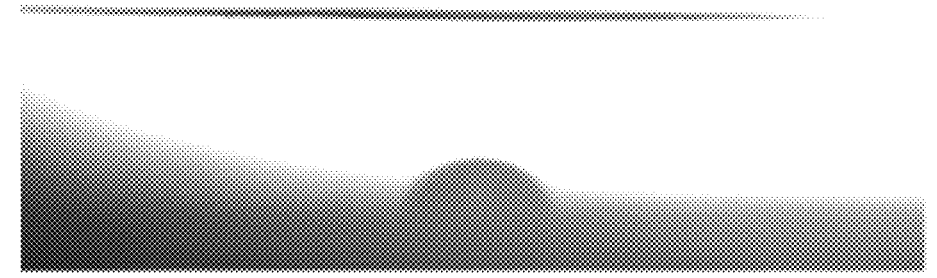

Example 4A: Coating Properties and Characterizations—Water Contact Angle Measurement As can be seen in FIG. 3, the water contact angle on the coated surface is close to zero. Attempts to measure it quantitatively turn out difficult, as it is below the 5° threshold that can be measured by the instrument. This already demonstrates that the coating is indeed superhydrophilic. The superhydrophilicity can be sustained for at least 3 months for coatings treated with methenamine.

Example 4B: Coating Properties and Characterizations—UV-Visible Absorbance

Figure 4:
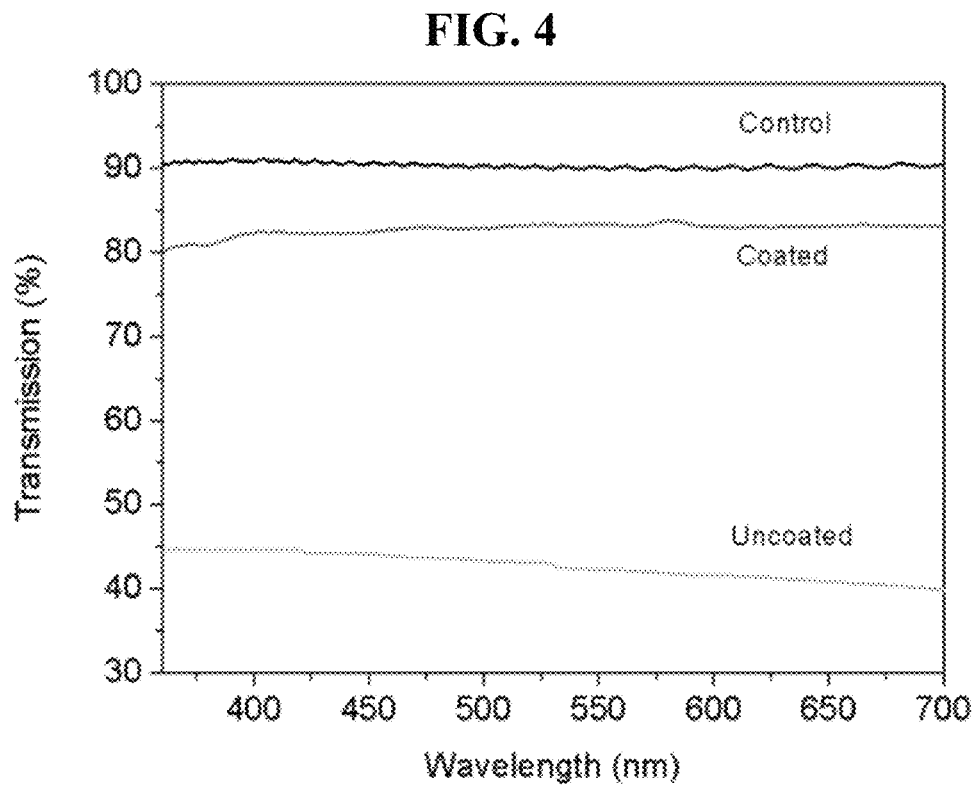
FIG. 4 shows the ultraviolet-visible (UV-Vis) transmission spectra of coated and uncoated surfaces after exposure to steam vapour from boiling water for 30 seconds. Control refers to a coated glass sample before steam exposure. The coated surface is able to meet the ASTM F659-10 standard, which requires transparency over 80%.

According to ASTM F659-10 standard, the anti-fog coating should exceed 80% transparency in the visible region, after being exposed to steam from boiling water for seconds. The coated surface was thus exposed to steam for 30 seconds, and the transparency was characterized using a Shimadzu UV-3600 UV-Vis-NIR spectrophotometer. From FIG. 4, it can be seen that the anti-fog property of the coated surface is able to satisfy the ASTM F659-10 standard. On the other hand, transparency of a similarly examined uncoated surface drops to around 40%.

Example 4C: Coating Properties and Characterizations—Durability Testing

The abrasion resistance of the coating was measured according to ASTM standard D3363 testing, using a Lantek HT-6510P Pencil Hardness Tester with a constant load of 7.5 N. Five lines with an approximate length of 5 cm were drawn across the film using a pencil loaded at an angle of 45° to the surface. The film hardness reading was recorded as the highest pencil grade which produced less than three visible scratch lines on the film, after the pencil mark was removed with an eraser. Depending on processing conditions, a range of pencil hardness was observed, with a variation of 3H to 5H. The highest pencil hardness of 5H was recorded for a coating that has gone through prolonged heat treatment of 150° C. for 30 minutes.

The coating adhesion on glass and metal was measured by a Elcometer 107 Cross Hatch Adhesion Tester according to ISO 2409 standard. A 6×2 mm cutter blade is loaded onto the cross hatch cutter, and a cross hatch pattern is formed by making 2 sets of deep cuts on the coating at a 90° angle. ISO 2409 adhesive tape was then applied firmly onto the cut pattern, and then removed parallel to the substrate after 90 seconds. Adhesion result is judged based on the amount of coating material that was removed by the tape. The present coating showed no visible loss of material, thus qualifying for the highest adhesion grade (ISO 2409 grade 0). This indicates strong adhesion between the coating and substrate.

Example 4D: Coating Properties and Characterizations—Microscopy

Figure 5:
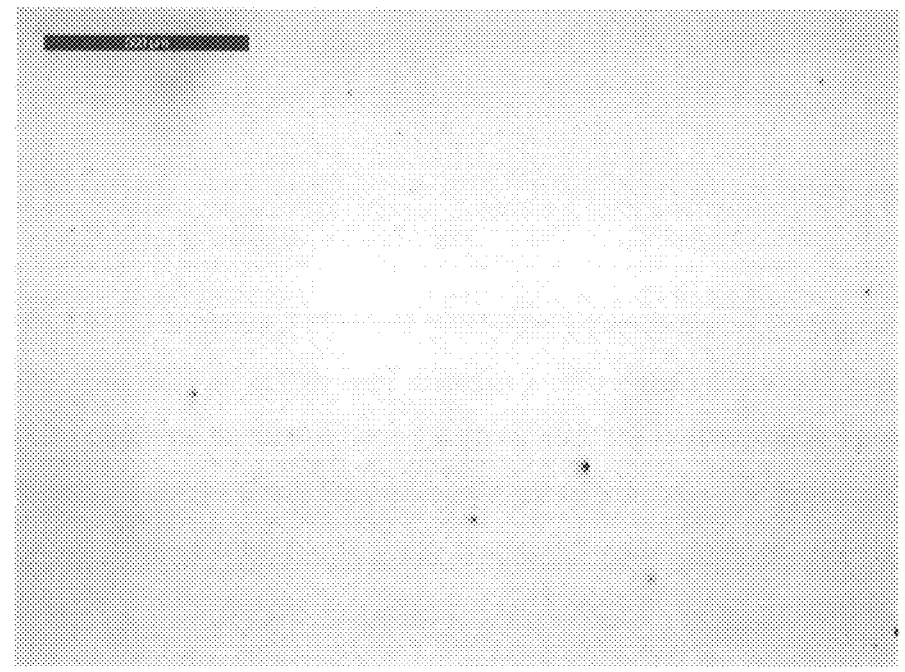
FIG. 5 is an optical microscopy image, showing that the coating of the present disclosure is relatively smooth and uniform with few scattered defects.
Figure 6:
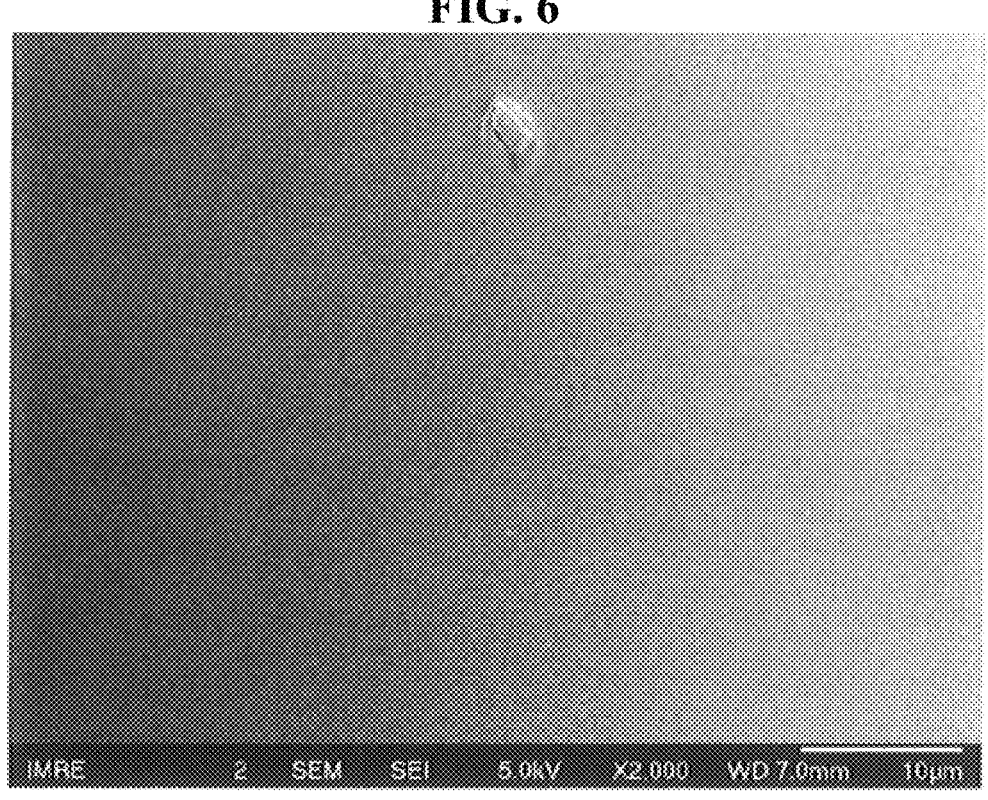
FIG. 6 is a scanning electron microscopy (SEM) image showing that the film is smooth at the microscopic level as well, with the exception of some minor defects. Scale bar denotes 10 μm.
Figure 7:
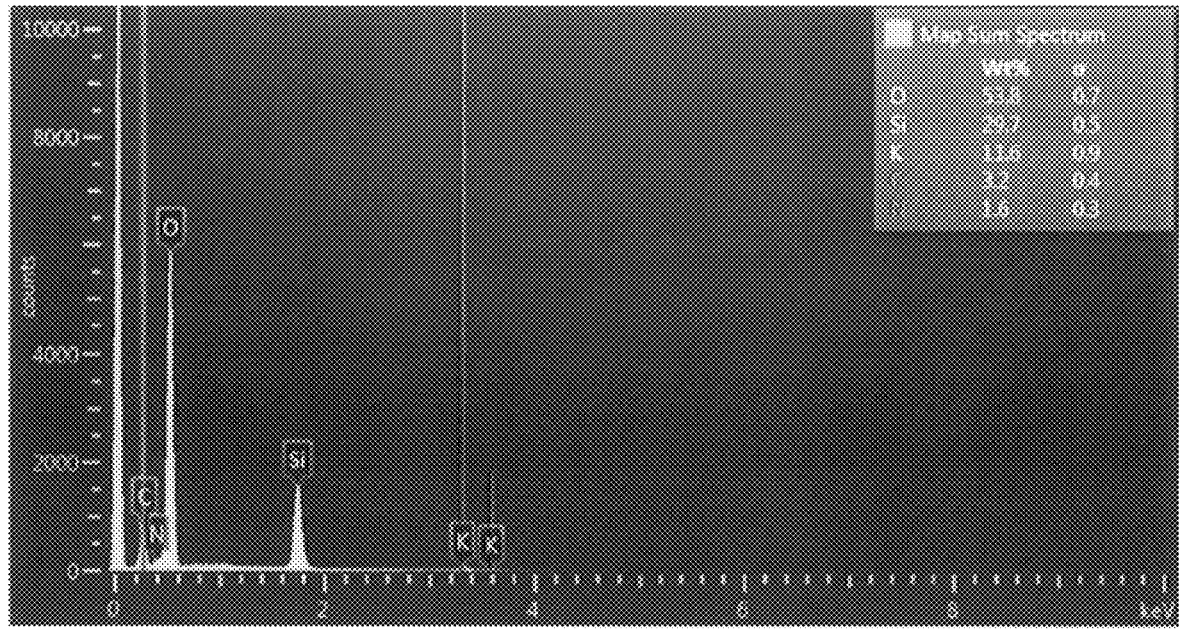
FIG. 7 shows the SEM energy-dispersive x-ray spectroscopy (EDX) data, indicating an elemental composition that is to be expected from the present coating chemistry, which contains predominantly silica ($SiO_2$) film with a small amount of potassium ions present.
Figure 8:
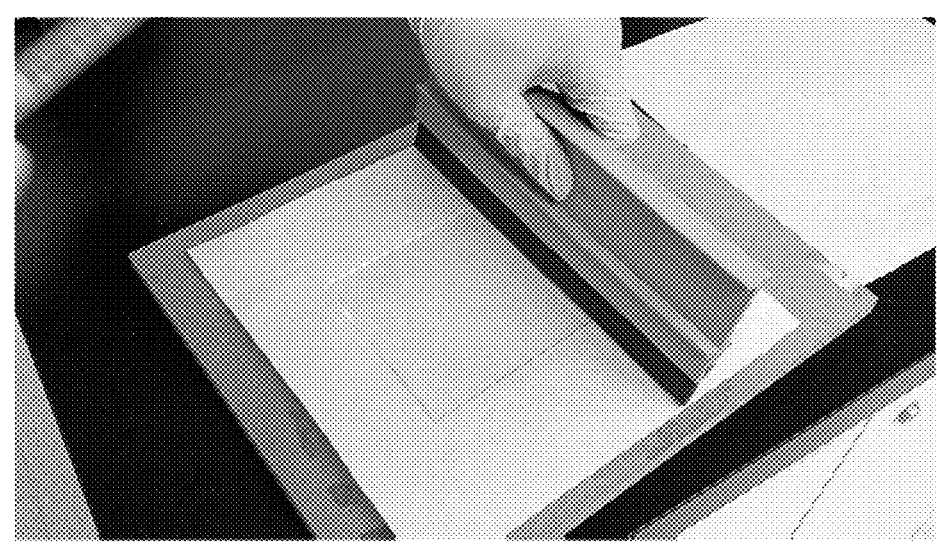
FIG. 8 shows a blade-coating process of the present disclosure.
Figure 9:
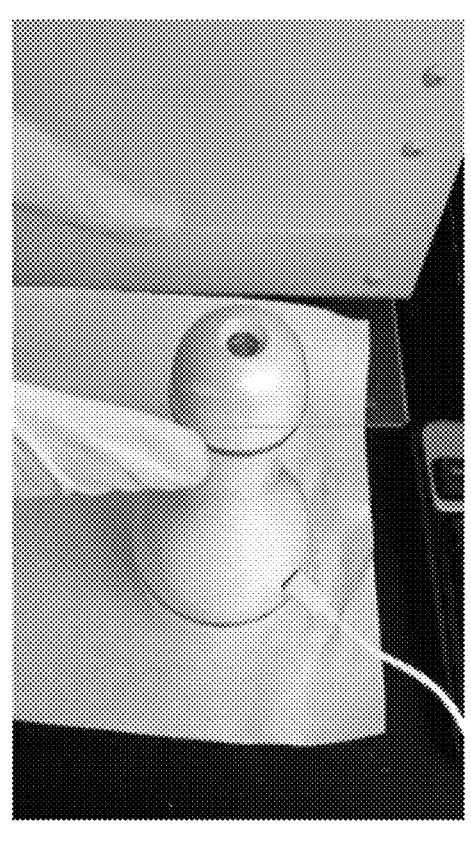
FIG. 9 shows water droplets from a humidifier spreading out effectively on a surface having a coating of the present disclosure (left image) compared to water beads forming on an uncoated surface and obscuring the transparency (right image).
Figure 9:
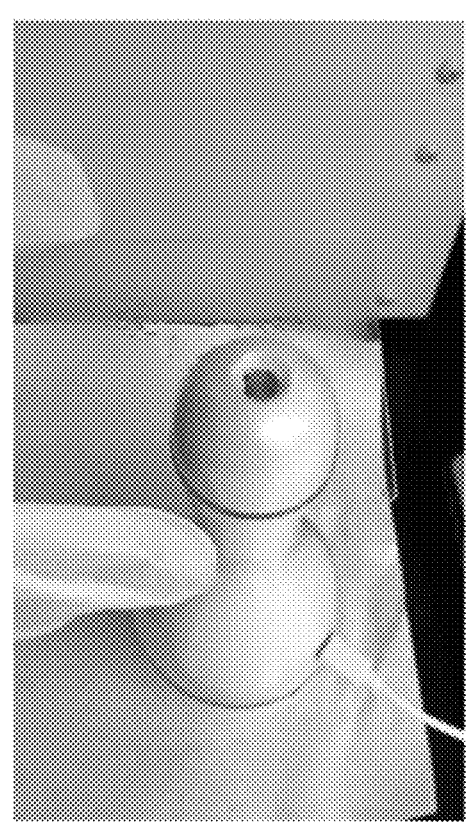
Figure 10:
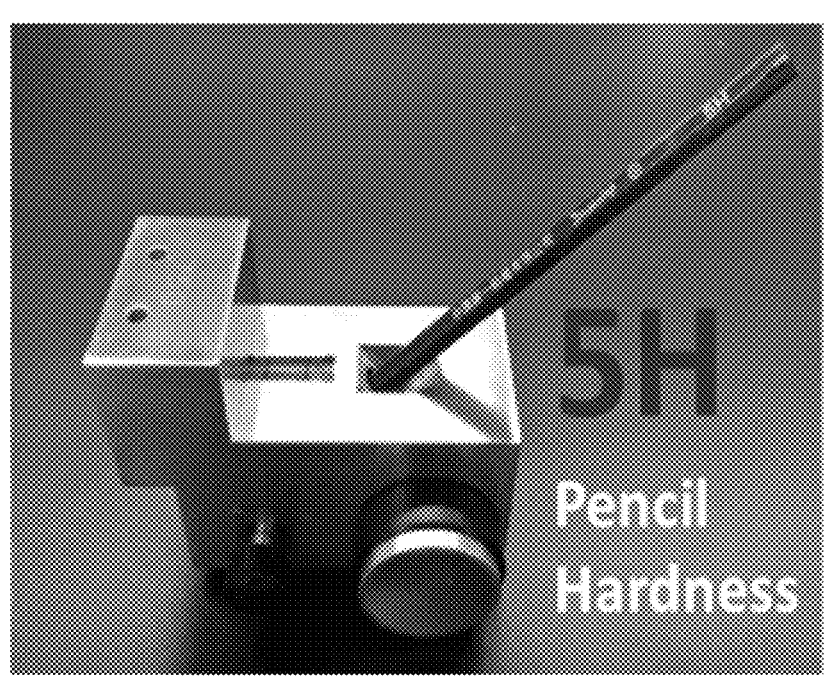
FIG. 10 shows the setup used for pencil hardness test, and the coating of the present disclosure achieves a hardness of 5H.

Various microscopy imaging was performed to look at film morphology at the macroscopic and also microscopic levels, using optical microscope and scanning electron microscope (SEM) respectively. Energy-dispersive X-ray spectroscopy (EDX) with the SEM was performed to look at elemental composition (see FIG. 5 to FIG. 7).

Example 5: Summary and Potential Commercial Applications

In summary, the present coating method and formulation involve an aqueous coating solution based on potassium silicate, and/or one or more stabilizing agents, such as but not limited to, fumed silica, methenamine. The present coating method and formulation may involve an alcohol-based acidic curing solution. The present coating method and formulation involve low temperature processes, not exceeding 150° C. (e.g. low temperature coating at 60° C.) and is able to achieve an inorganic coating having (i) durable superhydrophilic properties (e.g. water contact angle less than 10°), wherein the superhydrophilic properties can persists for at least 3 months, (ii) anti-fog performance exceeding ASTM F659-10 standard (more than 80% optical transmission after 30 seconds of steam exposure), (iii) durable with 3H to 5H pencil hardness (ASTM standard D3363 testing), and (iv) no delamination from cross-hatch adhesion test (with ISO 2409 adhesive tape). The resultant coating of the present method is completely inorganic and is not based on nanoparticles formation, i.e. the coating forms after deposition on a substrate rather than forming any nanoparticles in a solution. The resultant coating produced by the present method can be used for forming anti-fog surface, such as for swimming/diving goggles, spectacle lenses, car windows, bathroom mirrors, camera lens for autonomous vehicles, and in self-cleaning surfaces.

The present method advantageously, as described above, involves use of the alcohol-based acidic or alkaline earth metal halide solution for curing of the coating. It was not expected for the alcohol-based solution to have the same curing effect as an aqueous acid solution, but yet has the additional benefit of maintaining the coating's integrity. Traditionally, a waterglass coating may be partially dissolved by a pure aqueous solution, resulting in severely degraded mechanical properties and durability. The present method circumvents this.

The present method may involve an amine treatment, which is effective at stabilizing the coating and also enables the superhydrophilic effect to persist for a long time (over 3 months). Further advantageously, the amine stabilizer can help prevent efflorescence, which may include a reaction of the silicate with carbon dioxide to form carbonates that can be leached away by water.

While the present disclosure has been particularly shown and described with reference to specific embodiments, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. A method of producing a silica-based superhydrophilic film, the method comprising:

provihding a coating formulation comprising an alkali metal silicate, wherein the alkali metal silicate has a formula of $M_2O \cdot nSiO_2$, wherein M represents an alkali metal and n is a positive real number greater than zero;

depositing the coating formulation on a substrate prior to mixing the coating formulation and an alcohol, wherein the alcohol comprises a curing agent, wherein the curing agent comprises an aqueous acid or an alkaline earth metal halide; and drying the coating formulation, which contains the alcohol, to form the silica-based superhydrophilic film.

2. The method of claim 1, wherein n ranges from 0.4 to 40.

3. The method of claim 1, wherein providing the coating formulation comprises dissolving the alkali metal silicate in an aqueous solvent, wherein the aqueous solvent comprises water.

4. The method of claim 1, wherein the alkali metal comprises potassium, sodium, or lithium.

5. The method of claim 1, further comprises adding an aqueous amine stabilizer to the coating formulation and/or the alcohol prior to mixing the coating formulation and the alcohol.

6. The method of claim 5, wherein the aqueous amine stabilizer comprises methenamine in water, formamide in water, acetamide in water, or ethanolamine in water.

7. The method of claim 1, further comprises adding silica particles to the coating formulation prior to mixing the coating formulation and the alcohol.

8. The method of claim 1, wherein mixing the coating formulation and the alcohol comprises (i) applying the alcohol to the coating formulation or (ii) contacting the coating formulation with the alcohol.

9. The method of claim 1, wherein the alcohol comprises methanol, ethanol, isopropanol, 1-propanol, butanol, or 2-methoxyethanol.

10. The method of claim 1, wherein the aqueous acid comprises hydrochloric acid, sulfuric acid, phosphoric acid, nitric acid, or acetic acid.

11. The method of claim 1, wherein the alkaline earth metal halide is soluble in the alcohol, and wherein the alkaline earth metal halide comprises calcium chloride or magnesium chloride.

12. The method of claim 1, wherein mixing the coating formulation and the alcohol is carried out in a duration of 10 seconds or less.

13. The method of claim 1, wherein drying the coating formulation to form the silica-based superhydrophilic film is carried out at a temperature ranging from 20° C. to 150° C.

14. The method of claim 1, further comprising annealing of the silica-based superhydrophilic film.

* * * * *